US008756065B2

(12) United States Patent
Melamed et al.

(10) Patent No.: US 8,756,065 B2
(45) Date of Patent: Jun. 17, 2014

(54) CORRELATED CALL ANALYSIS FOR IDENTIFIED PATTERNS IN CALL TRANSCRIPTIONS

(75) Inventors: I. Dan Melamed, New York, NY (US); Yeon-Jun Kim, Whippany, NJ (US); Bernard S. Renger, New Providence, NJ (US); Andrej Ljolje, Morris Plains, NJ (US); David J. Smith, Millington, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1107 days.

(21) Appl. No.: 12/343,981

(22) Filed: Dec. 24, 2008

(65) Prior Publication Data

US 2010/0161315 A1    Jun. 24, 2010

(51) Int. Cl.
*G10L 21/00* (2013.01)
*G10L 25/00* (2013.01)
*G10L 15/00* (2013.01)

(52) U.S. Cl.
USPC .................. 704/270.1; 704/270; 704/231

(58) Field of Classification Search
USPC ............. 704/9, 231, 270.1, 274, E15.04
See application file for complete search history.

(56) References Cited

U.S. PATENT DOCUMENTS

| 7,783,028 | B2* | 8/2010 | Bantz et al. | 379/265.06 |
|---|---|---|---|---|
| 2003/0103619 | A1* | 6/2003 | Brown et al. | 379/266.01 |
| 2003/0115064 | A1* | 6/2003 | Gusler et al. | 704/270 |
| 2005/0010411 | A1* | 1/2005 | Rigazio et al. | 704/246 |
| 2006/0195321 | A1* | 8/2006 | Deligne et al. | 704/257 |
| 2006/0206306 | A1* | 9/2006 | Cao et al. | 704/4 |
| 2007/0071206 | A1* | 3/2007 | Gainsboro et al. | 379/168 |

* cited by examiner

*Primary Examiner* — Jesse Pullias

(74) *Attorney, Agent, or Firm* — Greenblum & Bernstein, P.L.C.

(57) ABSTRACT

A method of correlating received communication data with operational communication characteristics is provided. The method includes receiving audible input from a source in a communication over a communications network, recording the received audible input, and transcribing the recorded audible input into a transcript. The method further includes outputting the transcript, specifying features of the transcript to be analyzed, specifying and recording operational communication characteristics particular to the communication, analyzing the transcript for the specified features to identify patterns associated with the audible input, computing statistical correlations of the identified patterns with the operational communication characteristics, and outputting results of the computed statistical correlations on a user interface.

19 Claims, 3 Drawing Sheets

CORRELATED CALL ANALYSIS FOR IDENTIFIED PATTERNS IN CALL TRANSCRIPTIONS

BACKGROUND

1. Field of the Disclosure

The present disclosure relates to the field of communication networks. More particularly, the present disclosure relates to correlating and analyzing caller input in a communications network.

2. Background Information

Conventionally, speech transcription has been used as an aid in determining and evaluating customer satisfaction ratings with services and products within a communications network. More specifically, when customers call into customer service call centers to report problems with their service or products, the call centers store a record of the customers' interactions with customer service agents. These stored interactions are transcribed into transcripts.

It has been proposed that some call centers have implemented a search engine or search technique to search the transcripts for keywords or key phrases that may suggest a high customer satisfaction rating or a low customer satisfaction rating. Users at the call centers interested in customer service satisfaction ratings search through the transcripts to confirm or eliminate possible bases for what is believed to be a cause or a reason for increased or decreased customer satisfaction.

DETAILED DESCRIPTION

Figure 1:
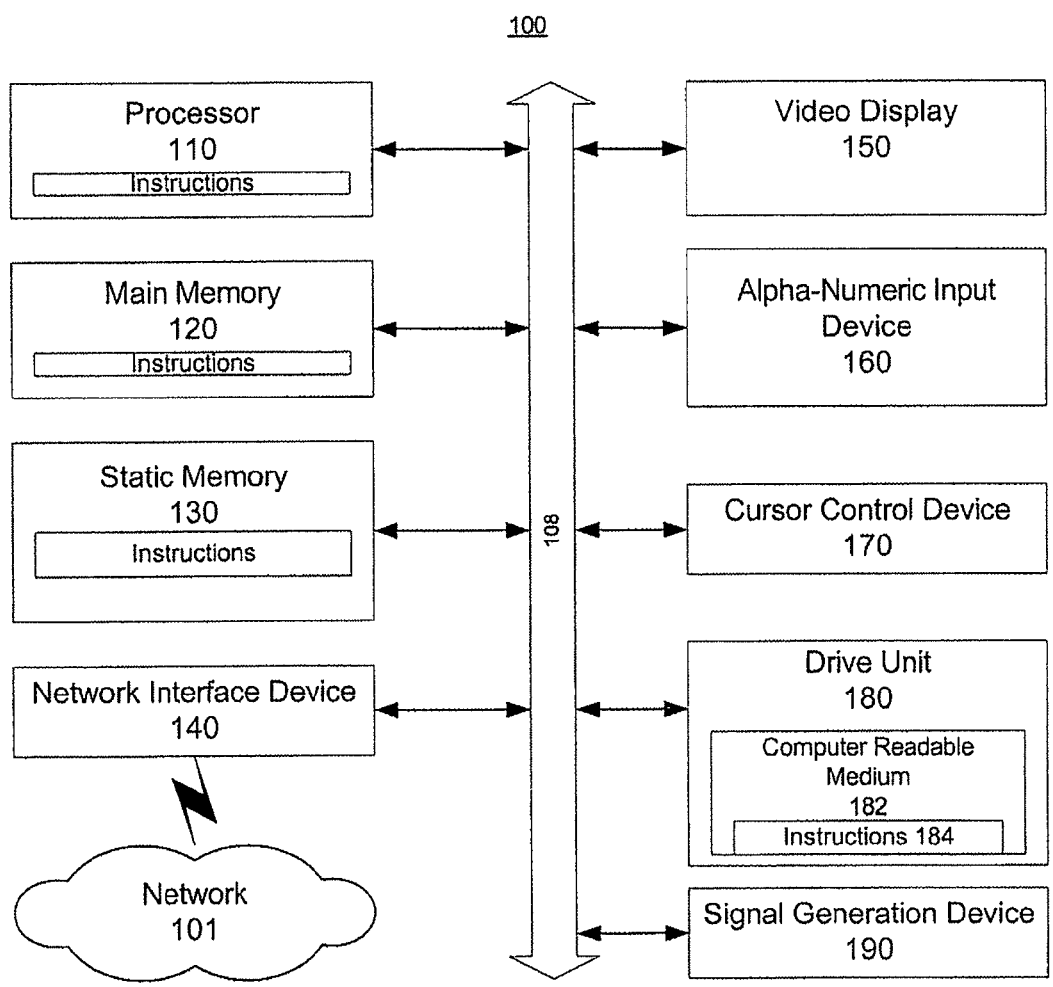
FIG. 1 shows an exemplary general computer system that includes a set of instructions for correlating received communication data with operational communication characteristics of a communications network.

In view of the foregoing, the present disclosure, through one or more of its various aspects, embodiments and/or specific features or sub-components, is thus intended to bring out one or more of the advantages as specifically noted below.

According to a non-limiting embodiment of the present disclosure, a method of correlating received communication data with operational communication characteristics is provided. The method may include receiving audible input from a source in a communication over a communications network, recording the received audible input, and transcribing the recorded audible input into a transcript. The method may further include outputting the transcript, specifying features of the transcript to be analyzed, specifying and recording operational communication characteristics particular to the communication, analyzing the transcript for the specified features to identify patterns associated with the audible input, computing statistical correlations of the identified patterns with the operational communication characteristics, and outputting results of the computed statistical correlations on a user interface.

According to a non-limiting aspect of the present disclosure, the method of analyzing the transcript may further include identifying repeated audible patterns corresponding to the audible input, identifying unique audible patterns corresponding to the audible input, storing identified repeated and unique audible patterns corresponding to the audible input, and outputting stored repeated and unique audible patterns.

According to another non-limiting aspect of the present disclosure, the specified features may include at least one speech recognition parameter. The at least one speech recognition parameter may include at least one of an acoustic, a prosodic, a lexical, a phonetic, a morphological, a syntactic, a semantic, a discourse, a dialog, and a speaker identification parameter.

According to yet another non-limiting aspect of the present disclosure, the operational communication characteristics may include information about at least one of a time, a date, an area code, a call duration, a geographic location, a network designation, an agent identifier, and a product identifier.

According to still another non-limiting aspect of the present disclosure, the method of correlating received communication data with operational communication characteristics may further include displaying the outputted results to determine at least one of customer satisfaction, call duration, and revenue generation within the communications network.

According to another non-limiting embodiment of the present disclosure, the method of correlating received communication data with operational communication characteristics may include transferring the received communication to a post-communication information gathering processor, requesting post-communication information input from the received communication, detecting results of the requested post-communication information input, outputting results of the requested post-communication information input, and computing statistical correlations of the identified patterns, the operational communication characteristics, and the results of the requested post-communication information input.

According to a non-limiting aspect of the present disclosure, the method of correlating received communication data with operational communication characteristics may further include receiving post-communication information audible input from the received communication, recording the post-communication information audible input from the received communication, transcribing the recorded post-communication information audible input into a post-communication information transcript, outputting the post-communication information transcript, specifying features of the post-communication information transcript to be analyzed, wherein the features include at least one speech recognition parameter, analyzing the post-communication information transcript for the specified features to identify patterns associated with the post-communication information audible input, and computing statistical correlations of the identified patterns of the post-communication information transcript with the operational communication characteristics.

According to another non-limiting aspect of the present disclosure, the method of correlating received communication data with operational communication characteristics may further include identifying repeated audible patterns corresponding to the post-communication information audible input, identifying unique audible patterns corresponding to the post-communication information audible input, storing identified repeated and unique audible patterns corresponding to the post-communication information audible input, and outputting stored repeated and unique audible patterns corresponding to the post-communication information audible input.

According to yet another non-limiting aspect of the present disclosure, the identified patterns may include at least one of a number of words, numbers, repeated words, words associated with emotional indicators, repeated prefixes, repeated suffixes, negative words, and positive words.

According to a non-limiting aspect of the present disclosure, the method of correlating received communication data with operational communication characteristics may further include collecting a plurality of computed statistical correlations from a plurality of received communications to identify trends within the communications network for determining at least one of customer satisfaction, call duration, and revenue within the communications network.

Further non-limiting aspects of the present disclosure may include activating alerts configured to identify certain correlation trends, and alerting a user within the communications network when the certain identified trends are produced.

According to a yet another non-limiting embodiment of the present disclosure, a system for correlating received communication data with operational communication characteristics, is provided. The system may include a recorder that receives and records audible input from a received communication over a communications network, a speech-recognition analyzer communicating with the recorder to transcribe the recorded audible input into a transcript, a speech-recognition database that includes speech-recognition features, a transcript analyzer that communicates with the speech-recognition analyzer and the speech-recognition database to analyze the transcript based on the speech-recognition features and identify patterns associated with the audible input, an operational communication characteristics processor that collects and records operational communication characteristics, a correlator that communicates with the transcript analyzer and the operational communication characteristics processor to compute statistical correlations of the identified patterns associated with the audible input and the recorded operational communication characteristics, and an outputter to display results of the computed statistical correlations.

According to a non-limiting aspect of the present disclosure, the transcript analyzer may be configured to identify unique and repeated audible patterns corresponding to the audible input, to store the identified unique and repeated audible patterns, and to output the stored unique and repeated audible patterns to the correlator.

According to another non-limiting aspect of the present disclosure, the speech-recognition features may include at least one speech recognition parameter.

According to yet another non-limiting aspect of the present disclosure, the at least one speech recognition parameter may include at least one of an acoustic, a prosodic, a lexical, a phonetic, a morphological, a syntactic, a semantic, a discourse, a dialog, and a speaker identification parameter.

According to still another non-limiting aspect of the present disclosure, the operational communication characteristics may include information about at least one of a time, a date, an area code, a call duration, a geographic location, a network designation, an agent identifier, and a product identifier.

According to a further non-limiting aspect of the present disclosure, the outputter may be configured to display results based on at least one of customer satisfaction, call duration, and revenue within the communications network.

According to still another non-limiting embodiment of the present disclosure, a tangible computer readable storage medium including a computer program for processing input variables in a system for correlating received communication data with operational communication characteristics is provided. The tangible computer readable storage medium may include a receiving code segment, recorded on the tangible computer readable storage medium, executable to receive, record and transcribe received communication audible input into a transcript, an analyzing code segment, recorded on the tangible computer readable storage medium, executable to analyze the transcript based on a speech-recognition database that includes speech-recognition features, a collecting code segment, recorded on the tangible computer readable storage medium, executable to collect and record operational communication characteristics, a correlating code segment, recorded on the tangible computer readable storage medium, executable to correlate, the analyzed transcript with the recorded operational communication characteristics, and an output code segment, recorded on the tangible computer readable storage medium, executable to display results of the correlations.

According to a non-limiting aspect of the present disclosure, the analyzing code segment may further include an identifying code segment, recorded on the tangible computer readable storage medium, executable to identify unique and repeated audible patterns based on the audible input, and a storing code segment, recorded on the tangible computer readable storage medium, executable to store and to output the unique and repeated audible patterns for correlation with the recorded operational communication characteristics.

FIG. 1 is an illustrative embodiment of a general computer system, on which a method to provide correlated call analysis can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
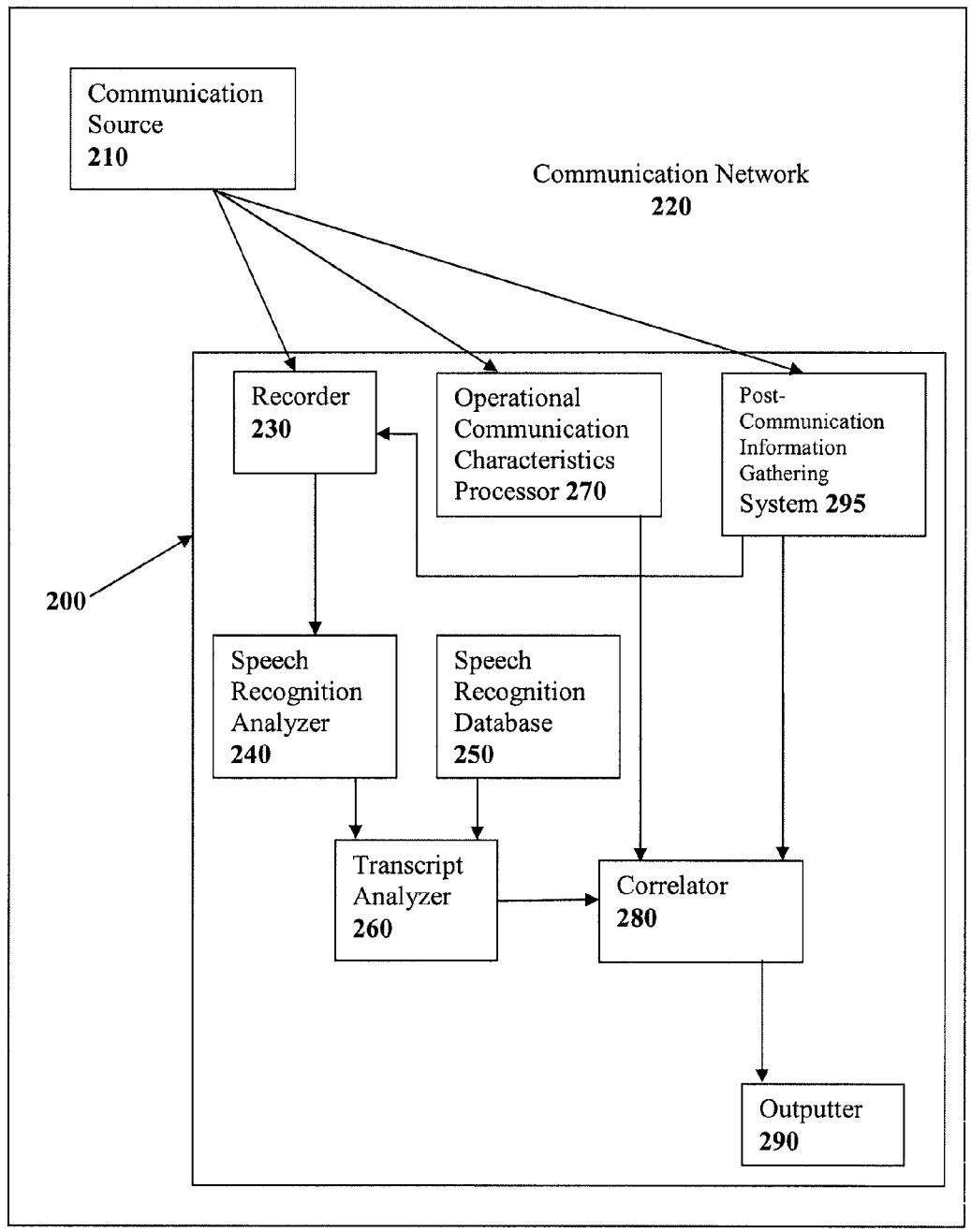
FIG. 2 illustrates an exemplary system for correlating received communication data with operational communication characteristics of a communications network, according to a non-limiting aspect of the present disclosure.

FIG. 2 illustrates an exemplary system 200 for correlating received communication data from a communication source 210 with operational communication characteristics in a communications network 220, according to a non-limiting aspect of the present disclosure. The system 200 includes a recorder 230 that receives and records audible input from the received communication source 210 over the communications network 220. In non-limiting embodiments, the audible input may be audible speech, and the communication source may be a wireless communication device customer. For example, if a customer of a wireless communication device, such as a cellular phone, has questions about service or billing or intends to provide feedback to the wireless communication carrier, the customer may call a customer service call center. When the call is received by the call center, the recorder 230 is activated.

The system 200 also includes a speech-recognition analyzer 240 which communicates with the recorder 230 and transcribes the recorded audible input into a transcript, a speech-recognition database 250 that includes speech-recognition features, and a transcript analyzer 260 that communicates with the speech-recognition analyzer 240 and the speech-recognition database 250. The transcript analyzer 260 analyzes the transcript based on the speech-recognition features and identifies patterns associated with the audible input. More specifically, the transcript analyzer 260 analyzes the transcript based on at least one speech recognition parameter, wherein the at least one speech recognition parameter may include at least one of an acoustic, a prosodic, a lexical, a phonetic, a morphological, a syntactic, a semantic, a discourse, a dialog, and a speaker identification parameter.

In the present disclosure, an acoustic parameter may be defined as logic that identifies audible sounds as speech; a prosodic parameter may be defined as logic that identifies the rhythm, stress, loudness, pitch and intonation of speech which may reflect a speaker's emotion; a lexical parameter may be defined as logic that identifies the structure of words, such as the presence of prefixes; a phonetic parameter may be defined as logic that identifies the pronunciation of words, patterns of sounds or articulation of syllables within words; a morphological parameter may be defined as logic that identifies the internal structure of words or the form of words, such as the word geese is the plural form for the word goose; a syntactic parameter may be defined as logic that identifies the structural relationship between words or sentence structure; a semantic parameter may be defined as logic that identifies the meaning of words, phrases and sentences based on context in which the words, phrases and sentences are formed; a discourse parameter may be defined as logic that identifies the relationship between related groups of sounds, words, phrases, and sentences; a dialog parameter may be defined as logic that identifies the relationship between communication acts, such as a conversation between speakers; and a speaker identification parameter may be defined as logic that identifies a speaker based on voice characteristics unique to the speaker.

The above definitions are merely provided for purposes of enhancing understanding of the present disclosure, and should not be considered as limiting. Those having ordinary skill in the art would readily understand that these definitions may be narrowed, extended or even overlap in certain circumstances. Further, those having ordinary skill would readily recognize that other speech recognition parameters may be substituted for the ones disclosed or added to the non-exclusive listing provided in the present disclosure.

In specifying each speech parameter, the transcript analyzer 260 may be able to identify, for example, words, sounds, and changes in voice pitch that may suggest an association with a human emotion, such as anger, sadness, happiness or excitement. The transcript analyzer 260 may also organize, store and draw from an inventory of identified speech parameters within a given transcript. The transcript analyzer 260 may also build up a library of identified speech parameters from a plurality of transcripts.

The speech recognition parameters provided are merely exemplary, and should not be considered as limiting the present disclosure. Those having ordinary skill in the art would readily understand that other speech recognition parameters may be implemented without departing from the scope of the present disclosure. It is also noted that the speech-recognition analyzer 240 may utilize any speech transcription method or technique known to those having ordinary skill in the art.

In embodiments, the transcript analyzer 240 is configured to identify unique and repeated audible patterns based on the speech recognition parameters corresponding to the audible input. The transcript analyzer 260 is further configured to store the identified unique and repeated audible patterns, and to output the stored unique and repeated audible patterns to a correlator 280, also provided within the system 200.

The patterns identified may include number of words, numbers, repeated words, words associated with emotional indicators, repeated prefixes, repeated suffixes, negative words, and positive words found in the transcript.

In embodiments, the transcript analyzer 260 may be configured to identify prosodic and lexical speech recognition parameters. Identifying prosodic speech parameters may include scanning the recorded audible input for changes in pitch during a particular utterance and duration of the utterance. Identifying lexical speech parameters may include scanning the recorded audible input for the frequency with which a particular utterance is made. For example the transcript analyzer 260 may identify that the speaker's pitch changes in every other sentence, and that the word "No" is repeated several times throughout the transcript. Thus, the transcript analyzer 260 may output this information for the correlator 280 to determine an association or disassociation between the identified patterns.

The system 200 also includes an operational communication characteristics processor 270 that collects and records operational communication characteristics. The operational communication characteristics may include information about at least one of a time, a date, an area code, a call duration, a geographic location, a network designation, an agent identifier, and a product identifier specific to the communication between the communication source 210 and the system 200 in the communications network 220. Thus, for example, the operational communication characteristics processor 270 may be configured to provide information to the system about a particular caller. That is, the operational communication characteristics processor 270 may communicate to the system 200 that the caller is calling from an area code in Ohio, using the latest release wireless device from a particular wireless device manufacturer, at 9 o'clock in the evening. The operational communication characteristics processor 270 may also record, for example, that a particular agent from a call center in Arizona received the call.

The plurality of information provided to the system 200, including the speech recognition parameters and the operational communication characteristics may be considered input variables. The input variables discussed above should not be considered as limiting, and the system 200 may be configured to include less or more input variables, and in any combination suitable to provide meaningful feedback to users analyzing incoming calls to the customer service call centers and the like. However, the information provided to the system is not limited to customer calls received by customer service call centers. In fact, other ways of collecting information to analyze within the system 200 is contemplated by the present disclosure. Accordingly, emails, text messaging, instant messaging with customer service agent over the internet, and webcam communications may also be contemplated. Further, the collected information may, for example, be re-routed from the call centers to a remote office collecting information from a plurality of call centers.

The correlator 280 communicates with the transcript analyzer 260 and the operational communication characteristics processor 270 to compute statistical correlations of the identified patterns associated with the audible input and the recorded operational communication characteristics. That is, the correlator 280 computes statistical correlations based on the input variables. For example, the correlator 280 may correlate an identified pattern where the words "DSL" and "outage" are repeatedly found throughout the transcript with an operational communication characteristic such as an area code that the customer is calling from, for example, Ohio. The correlator 280 may perform correlations based upon a single transcript or based on any number of transcripts from any number of received customer calls. It is contemplated that the correlator 280 may utilize any number of statistical computational methods known to those having ordinary skill in the art to process meaningful correlations among the plurality of selected input variable.

The system 200 also includes an outputter 290 to display results of the computed statistical correlations of the correlator 280. The outputter 290 is configured to display results based on at least one of customer satisfaction, call duration, and revenue within the communications network 220. Customer satisfaction, call duration and revenue may also be termed output variables. In this regard, the outputter 290 will display results of the computed statistical correlations on, for example, a monitor or print-out, and a user can automatically make a determination about one of customer service, call duration, or revenue.

More particularly, a user may be interested in determining why customer satisfaction is high or low. Based on the outputted correlated data the user may able to determine that the reason customer satisfaction is low is because a particular agent handles customers poorly or a network tower is down in a particular geographic region causing calls to be dropped or service to be interrupted.

The user may also be interested in the call duration in order to determine why calls are either short or long. That is, users may want to determine the number of calls waiting in a given queue, or where call time is being spent in an effort to improve call center efficiency. For example, a user may be interested in whether the customer is waiting to talk with an agent in billing, or whether the customer is looking to upgrade devices. In this way, the customer service call center may be able to improve, for example, routing efficiency keeping operational costs down and customer satisfaction high.

The user may likewise be interested in revenue generated by the calls. That is, the user may be interested in determining where revenue is being generated. For example, the user may make an inquiry as to what products or services are being pushed, what products and services are customers asking for, what agents are selling at the highest levels, and what products are actually being sold. Thus, as discussed above, the system 200 is customizable to accommodate the desires of the users interested in obtaining information regarding any one of the output variables.

It is further contemplated that the outputted statistical correlations may also be further correlated with information collected and stored in other databases in the communications network 220, and outside the communications network 220. For example, users may be interested in reviewing correlations between the outputted statistical correlations and information contained in a database from a related business unit such as a billing department or a sales and marketing department. That is, it is contemplated that users may correlate information relating to at least one customer service, call duration and revenue with information related to, for example, a billing information database or a sales and marketing database. In this way, users may be able to make additional meaningful determinations so as to improve the overall operation and performance of the communications network 220 and the related business units.

The outputted statistical correlations also enable users to better and more quickly understand where underlying problems may exist within the communications network 220. That is, the correlated call analysis improves navigation through the hierarchical structure of the communications network 220 for purposes of determining and improving customer satisfaction, call duration and revenue. In other words, the present disclosure eliminates the guesswork associated with conventional customer service evaluation systems. Thus, if the correlator 280 provides correlations between callers from Cleveland, Ohio communicating at or around 10 o'clock on a Saturday night repeatedly have the word "DSL" with several negative emotional indicators present in the transcript, the user may readily deduce that based on the output there may have been problems with DSL services in Cleveland, and that a telephone line may be damaged in the vicinity.

Thus, the user may then be able to quickly diagnose the problem within the hierarchy of the communications network 220, alert the proper personnel to correct the problem, and ultimately improve customer service. That is, the outputted correlations enable users to determine what part of the communications network 220 is performing well and what parts need improvement. The network hierarchical structure may include information relating to, for example, agents at specific call centers, cable lines in a particular neighborhood, and service capabilities of particular network devices and products.

In an alternative non-limiting embodiment of the present disclosure, a post-communication information gathering processor 295 may be provided within the system 200. The post-communication information gathering processor 295 communicates with the recorder 230 and the correlator 280. The post-communication information gathering processor 295 is activated once communication between the agent and the customer is terminated. The customer may be directed to the processor 295 which may be automated to interact with the customer. The customer may be prompted to respond to questions by providing one of either tactile input or audible input. The processor 295 requests, collects, records and stores the answers provided. If the input is tactile, the results are output to the correlator 280. If the input is audible, the processor 295 communicates with the recorder 230 for speech transcription (at 240) and transcript analysis (at 260). Thus, the correlator 280 may increase its ability to compute meaningful statistical correlations among the output received based upon the various input variables.

Figure 3:
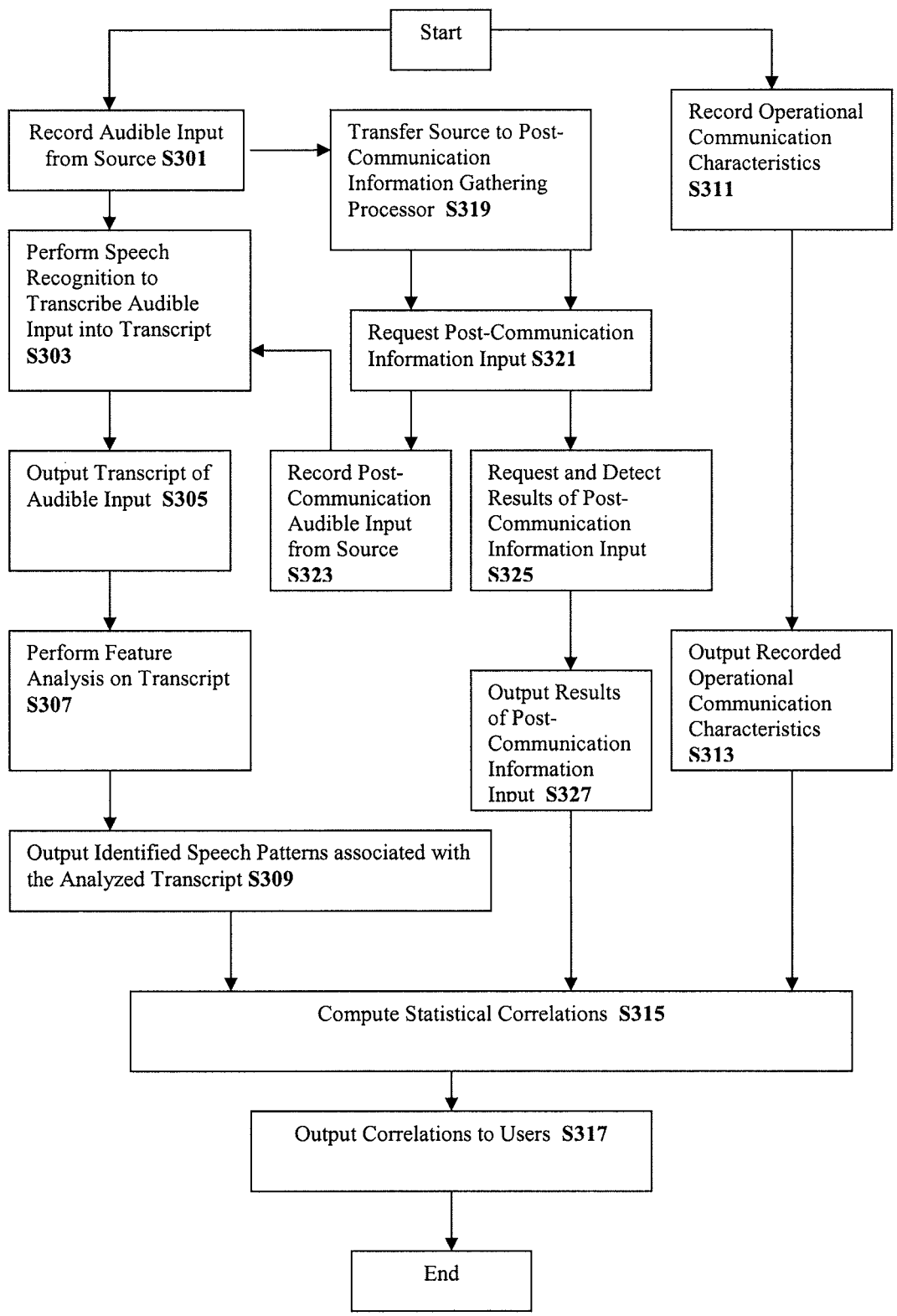
FIG. 3 is a flowchart depicting an exemplary method of correlating received communication data with operational communication characteristics of the communications network, according to a non-limiting aspect of the present disclosure.

FIG. 3 is a flowchart depicting an exemplary method of correlating received communication data with operational communication characteristics in a communications network, according to a non-limiting aspect of the present disclosure.

In operation, system 200 may perform the method as shown in FIG. 3. More specifically, in S301 the method includes receiving audible input from the communication source 210 in a communication over the communications network 220 and recording the received audible input. These methods may be performed by the recorder 230. In S303 and S305 the recorded audible input is transcribed into a transcript and output. These methods may be performed by the speech recognition analyzer 240.

The transcript analyzer 260 receives the outputted transcript and in S307 analyzes the transcript for specified features to identify patterns associated with the audible input. The method of specifying the features of the transcript to be analyzed is provided by the communication between the speech recognition analyzer 240 and the speech recognition database 250. The specifying may be done at the point of analyzing and it may be based upon a predetermined set of instructions to be executed during the analysis in S307. As discussed above, the specified features may include at least one speech recognition parameter including but not limited to at least one of an acoustic, a prosodic, a lexical, a phonetic, a morphological, a syntactic, a semantic, a discourse, a dialog, and a speaker identification parameter. In addition, the identified patterns may include at least one of a number of words, numbers, repeated words, words associated with emotional indicators, repeated prefixes, repeated suffixes, negative words, and positive words. In S307, the transcript analyzer 260 also identifies repeated and unique audible patterns corresponding to the audible input based on the above input variables, and stores the same to be output to the correlator 280.

In S309, the transcript analyzer 260 outputs the stored repeated and unique audible patterns to the correlator 280. It should be noted that the present discussion is based on communication at an instantaneous point in time. That is, the method as described is for a single phone call or a series of phone calls in a given day. It is contemplated that the method can perform multiple iterations over a given time period, which may result in more accurate results, and noticeable trends or anomalies in the correlated data.

In S311, the operational communication characteristics processor 270 specifies and records operational communication characteristics particular to the communication. Again as discussed above the operational communication characteristics may include information about at least one of a time, a date, an area code, a call duration, a geographic location, a network designation, an agent identifier, and a product identifier. In S313, the operational communication characteristics processor 270 outputs the operational communication characteristics to be sent to the correlator 280 for correlation with the other noted input variables.

The output from S309 and S313 is processed by the correlator 280. That is, in S315, the correlator 280 computes statistical correlations of the identified patterns with the operational communication characteristics, and in S317, the outputter 290 outputs the results of the computed statistical correlations, and displays the outputted results to the user on a user interface to determine at least one of customer satisfaction, call duration, and revenue generation within the communications network. A user interface may include a read-out on a computer monitor, a text message on a wireless device, and a print-out from a printer, although other user interfaces known to those having ordinary skill in the art are contemplated by the present disclosure as well. S317 may also include the methods of activating alerts configured to identify certain correlation trends, and alerting users within the communications network 220 when the certain identified trends are produced.

The user interface may also allow users to manually manipulate the system 200. That is, users may be able to manually group input variables or group input variables that have already been correlated, or in other words the user interface may be manipulated to compute second order correlations. The interface may also allow users to delete input variables to see if it affects the results of the correlations. The results may be provided in, for example, graphical or list form, whichever is preferable to the user to best convey the strength or weakness of the correlations. When the correlations are determined, the users may readily perform a drill down operation. The drill down operation allows users to go back to the recorded audible input to get a more in-depth analysis of the potential problem, and to more effectively come up with solutions to solve it.

The information recovered by the users may also be disseminated for purposes of sharing the information, presenting it, or merely exporting it for further analysis. Finally, the user interface may also allow users to set alerts when trends or anomalies are identified and to manage the sensitivity of the alerts.

In an alternative embodiment, the method may include transferring the received communication to the post-communication information gathering processor 295 (S319), requesting post-communication information input from the received communication (S321), detecting results of the requested post-communication information input (S325), outputting results of the requested post-communication information input (S327), and computing statistical correlations of the identified patterns, the operational communication characteristics, and the results of the requested post-communication information input (S315). These methods may be implemented in the system 200 via the post-communication information gathering processor 295.

After a call is complete or interaction with the agent is terminated, the customer may be re-routed to the post-communication information gathering processor 295. The post-communication information gathering processor 295 may provides questions/prompts after the communication with the agent is complete to allow customers to give customer satisfaction feedback via, for example, tactile input or audible input. If the feedback is tactile input, then the information corresponding to the tactile input is directed to the correlator 280 to also be correlated with the other input variables. If the feedback is audible input, it is recorded in S323, and directed to S303 for speech transcription as discussed in detail above (see S303-S309) to also be ultimately output to the correlator 280 to be correlated with the other input variables. Thus, the correlator 280 computes statistical correlations of the identified patterns, the operational communication characteristics, and the results of the requested post-communication information input (S315).

The present disclosure further contemplates collecting a plurality of computed statistical correlations from a plurality of received communications to identify trends and anomalies within the communications network 220 for determining at least one of customer satisfaction, call duration, and revenue within the communications network 220.

Accordingly, the present disclosure enables users to more effectively use speech transcription technology to automatically correlate received communications from a communication source with operational communication characteristics within a communications network. This allows users to more efficiently determine at least one of customer satisfaction, call duration and revenue within the communications network and ultimately improve the products and services provided by the communications network.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the present disclosure has been discussed as it relates to communication networks, the system and method may be implemented in other settings in which customer feedback is desired. For example, the travel industry may be interested in better understanding and determining what vacationers enjoy about booking trips, about activities during the trip, about accommodations during the trip or how a particular service may be improved for future vacationers. Other industries, such as the legal and accounting industries, as well as any number of government agencies, may also be interested in receiving feedback on efficiency in various capacities ranging from employee satisfaction in the work place to improving internal procedures, and because the present disclosure is highly customizable, it may be readily implemented in these alternative settings without departing from the scope and spirit of the present disclosure.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmissions represent examples of the state of the art. Such standards are periodically superseded by faster or more efficient equivalents having essentially the same functions. In this regard, the present disclosure may be applied to calls made over public switched telephone networks, wireless networks, or the internet. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of correlating received communication data with operational communication characteristics, comprising:
   receiving audible input from a source in an initial communication over a communications network, recording the received audible input, and transcribing the recorded audible input into a transcript;
   outputting the transcript;
   specifying features of the transcript to be analyzed;
   specifying and recording the operational communication characteristics particular to the initial communication;
   analyzing, using a computer processor, the transcript for the specified features to identify patterns associated with the audible input;
   terminating the initial communication and transferring the received communication source to a post-communication information gathering processor;
   requesting post-communication information input from the received communication source;
   detecting results of the requested post-communication information input;
   outputting results of the requested post-communication information input; and
   computing statistical correlations of the identified patterns with the operational communication characteristics and the results of the requested post-communication information input.

2. The method of claim 1, wherein analyzing the transcript further comprises:
   identifying repeated audible patterns corresponding to the audible input;
   identifying unique audible patterns corresponding to the audible input;
   storing identified repeated and unique audible patterns corresponding to the audible input; and
   outputting stored repeated and unique audible patterns.

3. The method of claim 1, wherein the specified features include a speech recognition parameter.

4. The method of claim 3, wherein the speech recognition parameter comprises at least one of an acoustic, a prosodic, a lexical, a phonetic, a morphological, a syntactic, a semantic, a discourse, a dialog, and a speaker identification parameter.

5. The method of claim 1, wherein the operational communication characteristics include information about at least one of a time, a date, an area code, a call duration, a geographic location, a network designation, an agent identifier, and a product identifier.

6. The method of claim 1, further comprising:
   displaying the outputted results to determine at least one of customer satisfaction, call duration, and revenue generation within the communications network.

7. The method of claim 1, further comprising:
   receiving post-communication information audible input from the received communication source;
   recording the post-communication information audible input from the received communication source;
   transcribing the recorded post-communication information audible input into a post-communication information transcript;
   outputting the post-communication information transcript;
   specifying features of the post-communication information transcript to be analyzed;
   analyzing the post-communication information transcript for the specified features to identify patterns associated with the post-communication information audible input; and
   computing statistical correlations of the identified patterns of the post-communication information transcript with the operational communication characteristics.

8. The method of claim 7, further comprising:
   identifying repeated audible patterns corresponding to the post-communication information audible input;
   identifying unique audible patterns corresponding to the post-communication information audible input;
   storing identified repeated and unique audible patterns corresponding to the post-communicationinformation audible input; and
   outputting stored repeated and unique audible patterns corresponding to the post-communication information audible input.

9. The method of claim 1, wherein the identified patterns comprise at least one of:
   a number of words;
   numbers;
   repeated words;
   words associated with emotional indicators;
   repeated prefixes;
   repeated suffixes;
   negative words; and
   positive words.

10. The method of claim 1, further comprising:
   collecting a plurality of computed statistical correlations from a plurality of received communications to identify trends within the communications network for determining at least one of customer satisfaction, call duration, and revenue within the communications network.

11. The method of claim 10, further comprising:
activating alerts configured to identify certain correlation trends; and
alerting a user within the communications network when the certain identified trends are produced.

12. A system for correlating received communication data with operational communication with operational communication characteristics, comprising:
a recorder that receives and records audible input from a source in an initial communication over a communications network;
a speech-recognition analyzer that communicates with the recorder to transcribe the recorded audible input into a transcript;
a speech-recognition database that includes speech-recognition features;
a transcript analyzer that communicates with the speech-recognition analyzer and the speech-recognition database to analyze the transcript based on the speech-recognition features, and identifies patterns associated with the audible input;
an operational communication characteristics processor that collects and records the operational communication characteristics particular to the initial communication;
a post-communication information gathering processor that communicates with the recorder, which is configured to terminate the initial communication and transfer the received communication source to the post-communication information gathering processor, to request and to process post-communication information input from the received communication; and
a correlator that communicates with the transcript analyzer, the operational communication characteristics processor and the post communication information gathering processor to compute statistical correlations of the identified patterns associated with the audible input, and the recorded operational communication characteristics and the processed post-communication information input; and
an outputter to display results of the computed statistical correlations.

13. The system of claim 12, wherein the transcript analyzer is configured to identify unique and repeated audible patterns corresponding to the audible input, to store the identified unique and repeated audible patterns, and to output the stored unique and repeated audible patterns to the correlator.

14. The system of claim 12, wherein the speech-recognition features include a speech recognition parameter.

15. The system of claim 14, wherein the speech recognition parameter comprises at least one of an acoustic, a prosodic, a lexical, a phonetic, a morphological, a syntactic, a semantic, a discourse, a dialog, and a speaker identification parameter.

16. The system of claim 12, wherein the operational communication characteristics include information about at least one of a time, a date, an area code, a call duration, a geographic location, a network designation, an agent identifier, and a product identifier.

17. The system of claim 12, wherein the outputter is configured to display results based on at least one of customer satisfaction, call duration, and revenue within the communications network.

18. A non-transitory computer readable storage medium comprising a computer program for processing input variables in a system for correlating received from a communication with operational communication characteristics, the tangible computer readable storage medium comprising:
a receiving code segment, recorded on the tangible computer readable storage medium, executable to receive, record and transcribe received communication audible input from a source in an initial communication into a transcript;
an analyzing code segment, recorded on the tangible computer readable storage medium, executable to analyze the transcript based on a speech-recognition database that includes speech-recognition features;
a collecting code segment, recorded on the tangible computer readable storage medium, executable to collect and record operational communication characteristics particular to the initial communication;
a transferring code segment, recorded on the tangible computer readable storage medium, executable to terminate the initial communication and to transfer the source for processing post-communication information input requested from the received communication;
a correlating code segment, recorded on the tangible computer readable storage medium, executable to correlate the analyzed transcript with the recorded operational communication characteristics and the processed post-communication information input; and
an output code segment, recorded on the tangible computer readable storage medium, executable to display results of the correlations.

19. The computer program of claim 18, wherein the analyzing code segment further comprises:
an identifying code segment, recorded on the tangible computer readable storage medium, executable to identify unique and repeated audible patterns based on the audible input; and
a storing code segment, recorded on the tangible computer readable storage medium, executable to store and to output the unique and repeated audible patterns for correlation with the recorded operational communication characteristics and the processed post-communication information input.

* * * * *

UNITED STATES PATENT AND TRADEMARK OFFICE
CERTIFICATE OF CORRECTION

PATENT NO. : 8,756,065 B2  
APPLICATION NO. : 12/343981  
DATED : June 17, 2014  
INVENTOR(S) : I. Melamed et al.

Page 1 of 1

It is certified that error appears in the above-identified patent and that said Letters Patent is hereby corrected as shown below:

In the Claims

At Column 14, line 49 (claim 8, line 7) of the printed patent, please change "post-communicationinformation" to --post-communication information--.

Signed and Sealed this
Seventeenth Day of February, 2015

Michelle K. Lee
*Deputy Director of the United States Patent and Trademark Office*